Aug. 9, 1938.   V. S. BEERY   2,126,605
BATTERY LIFTING DEVICE
Filed March 30, 1936
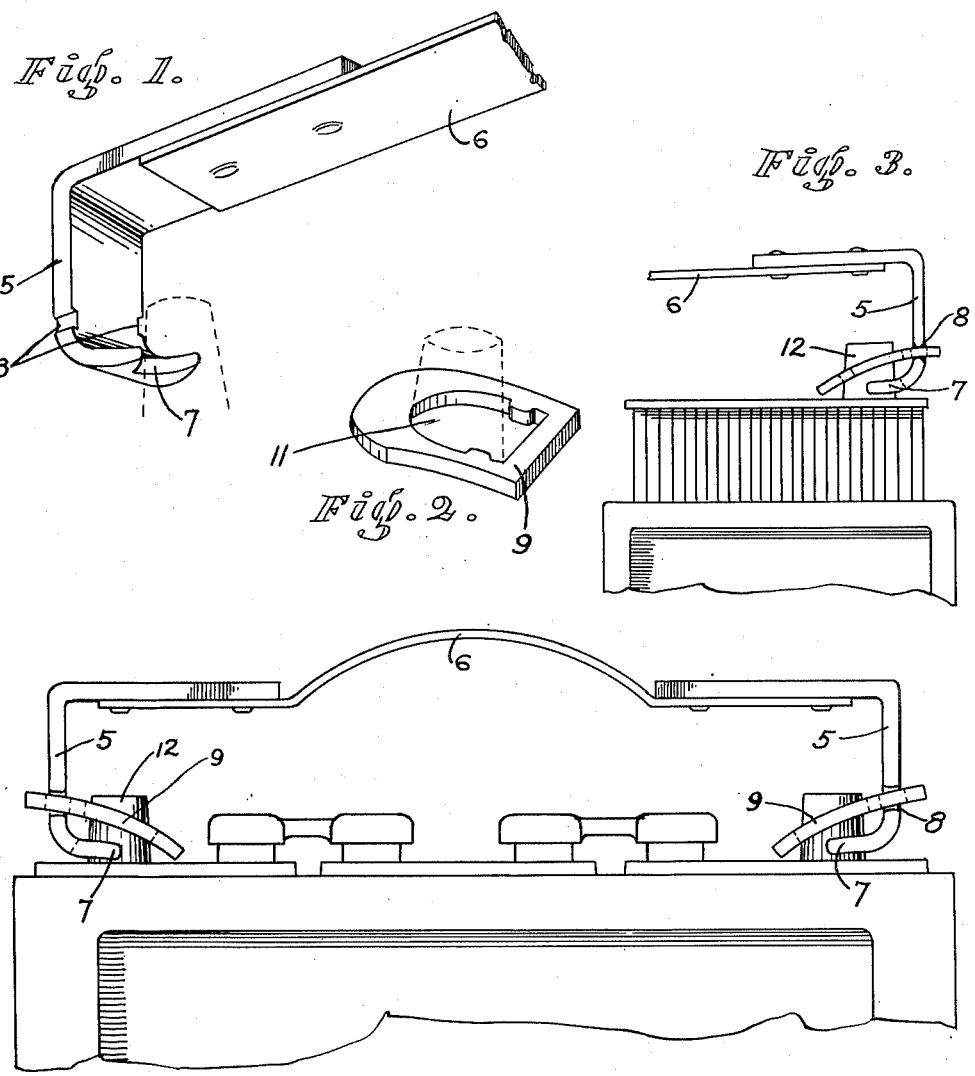
Inventor.
VIRGIL S BEERY
Victor J Evans & Co
Attorneys.

Patented Aug. 9, 1938

2,126,605

UNITED STATES PATENT OFFICE 2,126,605

BATTERY LIFTING DEVICE

Virgil S. Beery, Stockton, Calif.

Application March 30, 1936, Serial No. 71,706

1 Claim. (Cl. 294—92)

This invention relates to improvements in battery handling devices and has particular reference to a handle for transporting a battery.

A further object is to produce a device which is simple in construction and inexpensive to manufacture.

A further object is to produce a device wherein the individual cells of the battery, may be pulled from their case through the use of my handle.

Another object is to produce a device for carrying batteries which are not provided with any handles and without injuring the post to which the handle is to be attached by eliminating side strain thereto.

A still further object is to produce a device wherein there is no danger of short-circuiting the battery while handling, and a tool which can be only placed upon the terminals in one manner, thus assuring proper operation of my device.

Other objects and advantages will be apparent during the course of the following description.

In the accompanying drawing forming a part of this specification and in which like numerals are employed to designate like parts throughout the same, Fig. 1 is a perspective view of a portion of the gripper, Fig. 2 is a perspective view of the clamping element, Fig. 3 is a side elevation of the gripping element as the same would appear in removing a cell from the battery case, and Fig. 4 is a fragmentary top plan view of a standard battery having my invention applied thereto.

Ordinarily batteries are carried by picking them up with pieces of wire, rope, or by handles which are built upon the battery cases. Of late, however, battery manufacturers have been eliminating these handles in order to save cost and also on account of loss from breakage. It is, therefore, often difficult to handle a battery if the same is located in a more or less inaccessible place, and due to the weight of the battery it is often very difficult to lift the same out of its position. Applicant has, therefore, devised a removable handle which may be attached to any standard type of battery which handle will positively grip the terminal of the battery so that a direct lift thereon may be effected but without causing any side strain to the terminals.

In the accompanying drawing wherein for the purpose of illustration is shown a preferred embodiment of my invention, the numeral 5 designates a substantially L-shaped gripper which has a flexible handle made of insulating material secured thereto. At the opposite end of this handle there is a similar gripper and as both grippers are identical, but one will be described, the same numerals being applied to both grippers. The free end of the L-shaped member has a forked end 7 and slots 8 are formed in the side edges thereof. These slots serve to position the clamping element 9 and by viewing Figs. 3 and 4 it will be noted that this clamping element is curved so that the lower end thereof is substantially opposite the forked end 7. An opening 11 is formed in the clamping element so that battery terminals 12 may pass therethrough, while a pair of oppositely disposed noses 13 are formed on each of the clamping elements 9. Thus there is provided in reality a hinged action of the gripper and the clamping elements where they are connected at the notches, disclosed in Fig. 1; and they are so held in position for leverage, and there is allowance made for self-adjustment to different size, post, or object on which the lifter is placed.

When the parts are assembled as shown in Figs. 3 and 4 it will be apparent that the clamping element may be dropped over the terminal 12 due to the pivotal action between the clamp and the forked end of the L-shaped member, and immediately on lifting upon the handle 6 the L-shaped member will be swung outwardly so as to cause a biting action between the forked end 7 and the opposing edge of the slot 11 and that the greater the lift, the greater the clamping action but without causing any side strain upon the terminal and that as soon as the handle is released the parts may be readily removed for use upon different terminals. It is apparent that my device may also be used for carrying other objects wherein a similar gripping action may be accomplished.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A lifting device for batteries comprising a handle member, a pair of gripping members connected thereto, each of said gripping members being of a substantially L-shaped configuration and having a forked extremity with notches formed in the sides adjacent the forked extremity, a curved apertured clamping element engaging and pivotally mounted in said notches, and a pair of oppositely disposed noses formed in said aperture and adapted to limit movement of said curved element on said L-shaped member, thereby maintaining said curved element in said notches, whereby when said gripping members engage a battery terminal and upon upward movement of said handle, said gripping members will exert a clamping action on opposite sides of the terminal.

VIRGIL S. BEERY.